United States Patent [19]

Corner et al.

[11] 4,320,790

[45] Mar. 23, 1982

[54] TIRE TREADS

[75] Inventors: Michael R. Corner, Coventry; Barry J. Allbert, Sutton Coldfield, both of England

[73] Assignee: Dunlop Limited, London, England

[21] Appl. No.: 125,583

[22] Filed: Feb. 28, 1980

[30] Foreign Application Priority Data

Mar. 7, 1979 [GB] United Kingdom ............... 08019/79

[51] Int. Cl.$^3$ ............................................. B60C 11/04
[52] U.S. Cl. ................................. 152/209 R; D12/142
[58] Field of Search ....................... 152/209 R, 209 D; D12/140, 142, 146, 147, 148, 151

[56] References Cited

U.S. PATENT DOCUMENTS

| D. 250,463 | 12/1978 | Jamain | D12/149 |
|---|---|---|---|
| 3,534,798 | 10/1970 | Ravenhall | 152/209 R |
| 3,570,571 | 3/1971 | Riches | 152/209 R |
| 3,799,231 | 3/1974 | Boileau | 152/209 R |

*Primary Examiner*—Michael W. Ball
*Attorney, Agent, or Firm*—Stevens, Davis, Miller & Mosher

[57] ABSTRACT

A tire tread and a tire including a tread when the tread width is divided into circumferentially extending ribs by two or more circumferential grooves and at least one rib is subdivided into tread elements by transversely extending slots. The grooves are such that they close in the contact patch to resist movement between the tread elements and the slots provide water holding capacity for wet road use.

15 Claims, 1 Drawing Figure

TIRE TREADS

This invention relates to tire treads, in particular to tire tread constructions for heavy vehicle tires. By heavy vehicle tires are meant tires having a designed service load carrying ability greater than 2000 lbs (900 Kg). Said tires are used on trucks, commercial vehicles and public service vehicles.

Several factors influence the performance of heavy vehicle tire treads. In general tread life may be increased by increasing the contact area of tread rubber in a given contact patch area (this having the effect of reducing contact pressure for a given load). In the case of a tread which is subdivided into a given number of tread elements, e.g. ribs and blocks the rate of abrasion is an inverse function of tread element size. Abrasion and irregular wear are also both affected by the stability i.e. resistance to deformation in both the transverse and circumferential directions of the tread and its elements in the contact patch. Wear is aggravated by the necessity to subdivide the tread area to provide for wet grip which varies as an inverse function of the tread element size.

Thus conventional heavy vehicle tire treads are a comprimise between the need to provide the maximum amount of rubber in contact with the road in combination with the essential passages for water drainage from the contact patch. Conventional heavy vehicle tires comprise one or more wide zig-zag grooves around the circumference of the tire for bulk water drainage together with other grooves, slits or narrow slots as found necessary for wet grip. Such treads, however, are prone to irregular wear patterns particularly on undriven axles when subjected to high speed straight ahead use and even the best heavy vehicle tires currently available have wet grip levels 30%-40% inferior to current passenger car tires.

Furthermore, stone trapping puts further restriction on the shape and size of grooves which may be used in practice and it is well known that grooves having widths between 3 mm and 8 mm are particularly prone to picking up and retaining stones which may subsequently damage the tire whereas narrower and wider grooves are not subject to this problem.

According to one aspect of the present invention a tire tread for a heavy vehicle comprises at least two longitudinally extending grooves which divide the full width of the tread into three or more longitudinally extending ribs and a series of spaced apart transversely extending slots which subdivide at least one rib into discrete tread elements, the grooves being shaped so that in use on a vehicle when the tire tread is in the contact patch the opposed sides of the ribs engage to resist relative movement of the tread elements.

The grooves may be straight but preferably the grooves have a zig-zag configuration formed by short straight portions with each straight portion at an acute angle in the range of 10°-40° to the longitudinal or circumferential direction.

The opposed sides of the ribs may engage together at spaced apart points in the longitudinal direction or continuously through the contact patch. The engagement may be only at the top or radially outer part of the ribs. The grooves may be sufficiently narrow for the opposed sides to engage together for substantially the whole depth of the ribs. While in the transverse direction the ribs are interlocked mainly by direct compression forces from the contact of the opposed sides of the ribs, the interlocking in the circumferential direction may be entirely due to the frictional forces between contacting opposed sides of a rib or may comprise in part a mechanical interlocking. Preferably the grooves are between 1 and 3 mm wide and more preferably are 2 mm wide. In some arrangements the grooves may be widened at the bottom to provide a bulbous base connecting the slots through which water may flow.

The transversely extending slots are preferably wide and a width greater than 8 mm may be utilized. The slots act as water reserviors so that full ground contact is achieved in wet conditions even when the road surface itself cannot accommodate the water in its uneven surface. The slots are preferably irregularly spaced along the length of the tread to reduce noise when used on a tire. Slots may be provided in only one rib or in all the ribs of a tread. Preferably, however, slots are provided to subdivide each rib except for the two outer or shoulder ribs.

Small slits or sipes may be cut into the ribs or element of the tread.

In the specification a slot has a volume and remains open in the contact of the tire, a groove has volume but closes to effect locking in the contact patch and a slit or sipe has no significant volume and is effectively closed both in and out of the contact patch.

In operation the tire tread of the present invention provides a maximum area of tread rubber in the contact patch where the grooves are closed and yet the edges of the grooves and the slots provide edges for wet grip. The slots and grooves provide the required volume to accommodate residual water trapped in the contact patch and finally the interlocking of the ribs or elements provides support to resist either the ribs or elements from being locally displaced and minimizes the usually found uneven wear particularly on non-driven commercial vehicle axles.

According to another aspect of the present invention a tire for a heavy vehicle comprises a tire tread including at least two circumferentially extending grooves which divide the full width of the tread into three or more ribs around the circumference of the tire and a series of spaced apart transversely extending slots which subdivide at least one rib into discrete tread elements, the grooves being shaped so that in use on a vheicle when the tire tread is in the contact patch the opposed sides of the ribs engage to resist relative movement of the tread elements.

Preferably the tire is a radial tire with a substantially rigid tread reinforcing breaker.

Further aspects of the present invention will be made apparent from the following description by way of example only of one embodiment of the invention in conjunction with the attached diagrammatic drawings in which.

Figure 1:
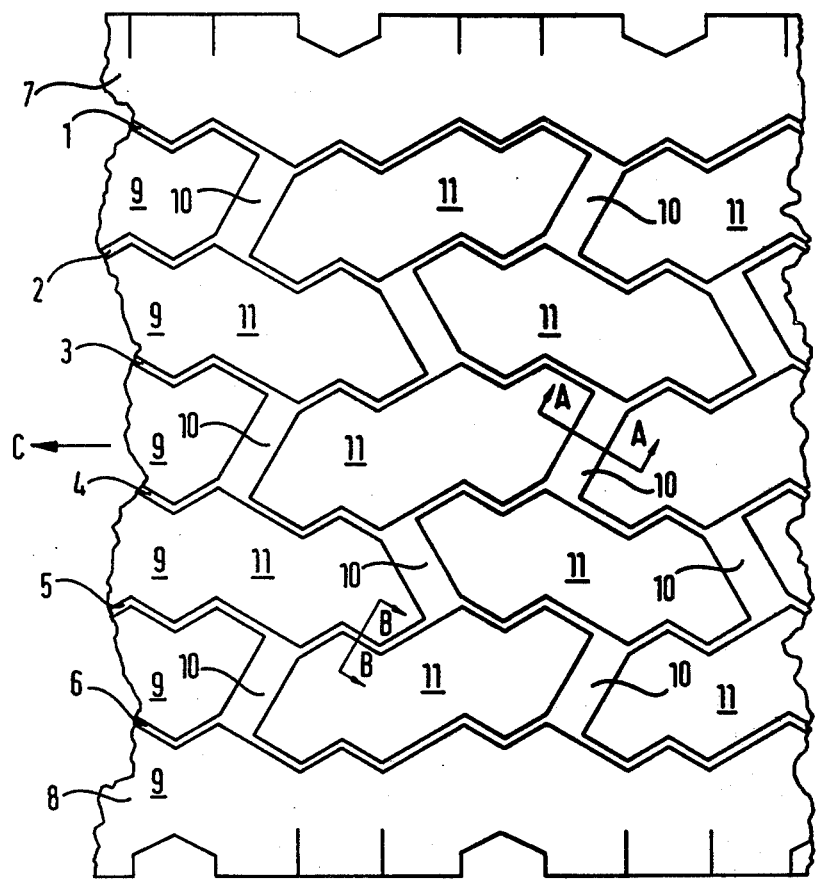
FIG. 1 is a plan view of a section of tire tread of a tire having a circumferential centre-line C according to one aspect of the present invention.
Figure 2:
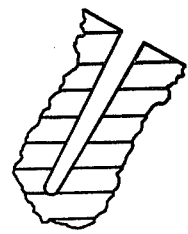
FIG. 2 is a scrap section on the line B—B of FIG. 1.

The tire tread of FIG. 1 is for a 11/70 R 22.5 tire and comprises six equally spaced circumferential grooves 1, 2, 3, 4, 5 and 6 which subdivide the width of the tread into seven ribs. Each groove has a zig-zag configuration in plan and in cross-section is formed so that it closes as the tread enters the ground contact patch in use and re-opens as it leaves the ground contact patch. The grooves 1-6 as shown in FIG. 2 have a depth of 14.5 mm and are 2 mm wide at the tread surface in the new state of the tire.

The ribs 7 and 8 at the edges of the tread are continuous ribs and include a shoulder pattern of straight-forward conventional form. The central five ribs 9 are each subdivided into discrete tread elements or blocks 11 by means of circumferentially spaced apart generally transversely extending slots 10. It should be noted that the slots 10 are not exactly transverse but are at about 30° to the transverse direction and also that they are not exactly regularly spaced around each rib.

Figure 3:
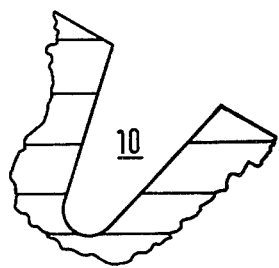
FIG. 3 is a scrap section on the line A—A of FIG. 1.

The cross-section of the slots 10 is shown in FIG. 3, the slot having a width of 10 mm at the tread surface in the new state of the tire such that the slots 10 remain always open. The spacing of the slots 10 is such that the tread elements 11 each include at both the long sides two or more 'vees' so that when the grooves 1-6 are closed in the contact patch the tread elements 11 are mechanically locked in position.

In operation of the tire the grooves 1-6 and slots 10 provide the necessary breaks in the volume of the thread rubber. The grooves 1-6 and slots 10 also provide suffcient edges for good wet grip and the slots primarily provide sufficient water holding capacity in the central regions of the contact patch to allow the essential full contact between the tread and the road surface.

The interlocking between the components of the tread substantially increases the resistance to localized deformation of the individual elements thus greatly improving their resistance to abrasion.

Furthermore, the ratio between the area of tread surface and the open spaces in the contact patch, which is often called the land:sea ratio is of the order of 90:10 which is much higher than conventional truck tires where the ratio is typically 70:30 to 80:20. Thus the tread life of the present tire is significantly longer than conventional tires.

It will be appreciated that still further improved water drainage may be obtained by widening the bases of the grooves to form bulbous bases through which water can pass from slot to slot around the tire. Furthermore, various slot cross-sections can be used.

The engagement of the sides of the ribs to hold the tread elements in place may be entirely frictional or part mechanical as described. The groove shown is thought to engage at all points along the rib but engagement may be provided at spaced apart points as long as the tread elements are sufficiently locked in place to avoid uneven wear.

Having now described our invention, what we claim is:

1. A tire tread for a heavy vehicle comprising at least two circumferentially extending grooves which divide the full width of the tread into at least three circumferentially extending ribs and a series of spaced apart transversely extending slots of a width wider than said circumferential grooves such that they do not close when they are in the contact patch and which subdivide at least one rib into discrete tread elements, the slots thus providing a plurality of road gripping edges for good wet grip; the grooves having a zig-zag configuration comprising short straight portions at an actue angle in the range of 10°-40° to the longitudinal direction of the tread so as to inter-engage adjacent tread elements and being shaped so that in use on a vheicle when the tire thread is in the contact patch the opposed sides of the ribs engage to resist relative movement of the tread elements and said transverse slots remain open.

2. A tire tread according to claim 1 wherein the ribs, in the contact patch, engage only at the top or radially outermost part of the ribs.

3. A tire tread according to claim 1 wherein the grooves, in the contact patch, are sufficiently narrow so that the ribs engage together for substantially the whole depth of the ribs.

4. A tire tread according to claim 1 wherein the grooves are between 1 and 3 mm wide.

5. A tire tread according to claim 1 wherein the grooves are 2 mm wide.

6. A tire tread according to claim 1 wherein the grooves are widened at the bottom so as to provide a bulbous base connecting the slots throuh which water may flow.

7. A tire tread according to claim 1 wherein the transversely extending slots have a width greater than 8 mm.

8. A tire tread according to claim 1 wherein the slots are irregularly spaced along the length of the tread to reduce noise when used on a tire.

9. A tire tread according to claim 1 wherein slots are provided in only one rib.

10. A tire tread according to claim 1 wherein slots are provided to subdivide each rib except for the two outer or shoulder ribs.

11. A tire for a heavy vehicle comprising a tire tread according to claim 1.

12. A tire according to claim 1 wherein the tyre is a radial tire with a substantially rigid tread reinforcing breaker.

13. The tire tread of claim 1, in which the ratio of tread surface to open spaces in the contact patch is approximately 90:10.

14. The tire tread of claim 1, in which at least one of said circumferentially extending grooves is of substantially uniform width along its length.

15. A tire tread for a heavy vehicle comprising at least two circumferentially extending grooves which divide the full width of the tread into at least three circumferentially extending ribs and a series of spaced apart transversely extending slots in each rib except for the two outer or shoulder ribs, said slots being of a width wider than said circumferential grooves such that they do not close when they are in the contact patch and which subdivide at least one rib into discrete tread elements, the slots thus providing a plurality of road gripping edges for good wet grip; the grooves being shaped so that in use on a vheicle when the tire tread is in the contact patch the opposed sides of te ribs engage to resist relative movement of the tread elements and said transverse slots remain open.

* * * * *